No. 754,401. PATENTED MAR. 8, 1904.
G. WHITE.
TIME RECORDER.
APPLICATION FILED MAY 23, 1895.
NO MODEL. 11 SHEETS—SHEET 2.

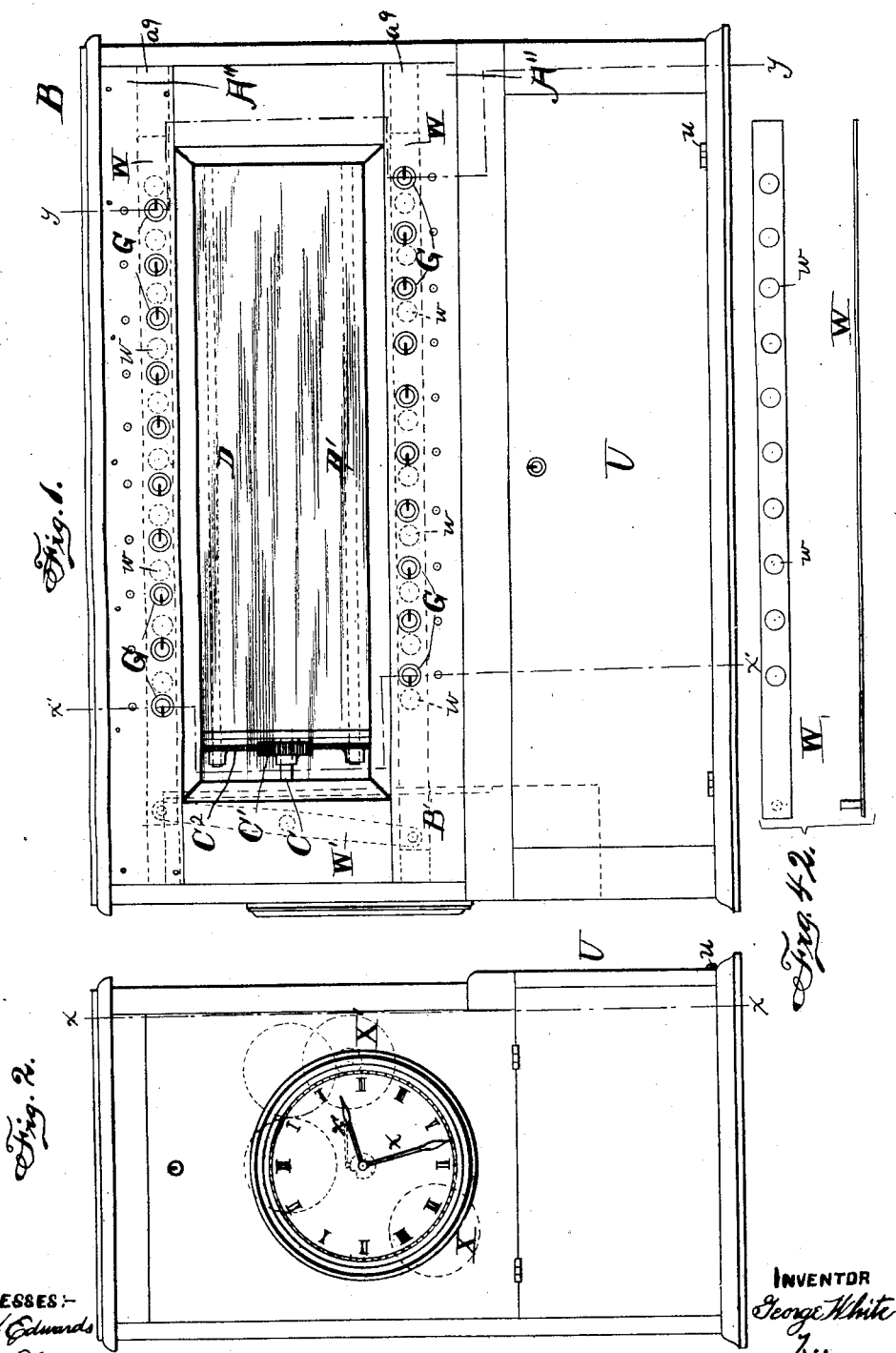

WITNESSES
W. H. Edwards.
Arthur L. Bryant

INVENTOR
George White,
by H. H. Bliss
ATTY.

No. 754,401. PATENTED MAR. 8, 1904.
G. WHITE.
TIME RECORDER.
APPLICATION FILED MAY 23, 1895.
NO MODEL. 11 SHEETS—SHEET 4.

WITNESSES:
Wm. H. Edwards
Arthur Bryant

INVENTOR:
George White
by H. H. Bliss
ATTY.

No. 754,401. PATENTED MAR. 8, 1904.
G. WHITE.
TIME RECORDER.
APPLICATION FILED MAY 23, 1895.
NO MODEL. 11 SHEETS—SHEET 5.

WITNESSES
Wm H. Edwards
Arthur L. Bryant

INVENTOR
George White
by H. H. Bliss
ATTY.

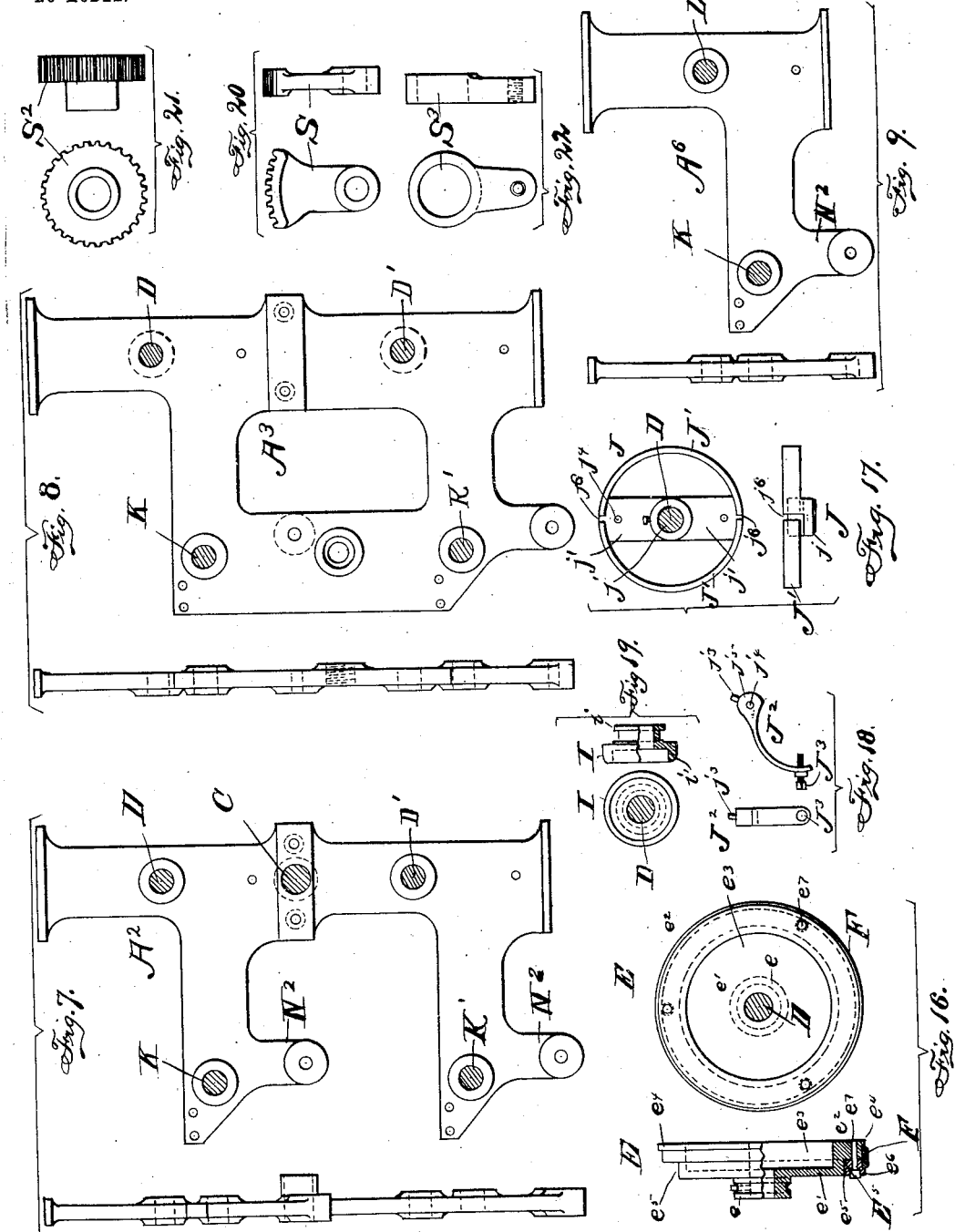

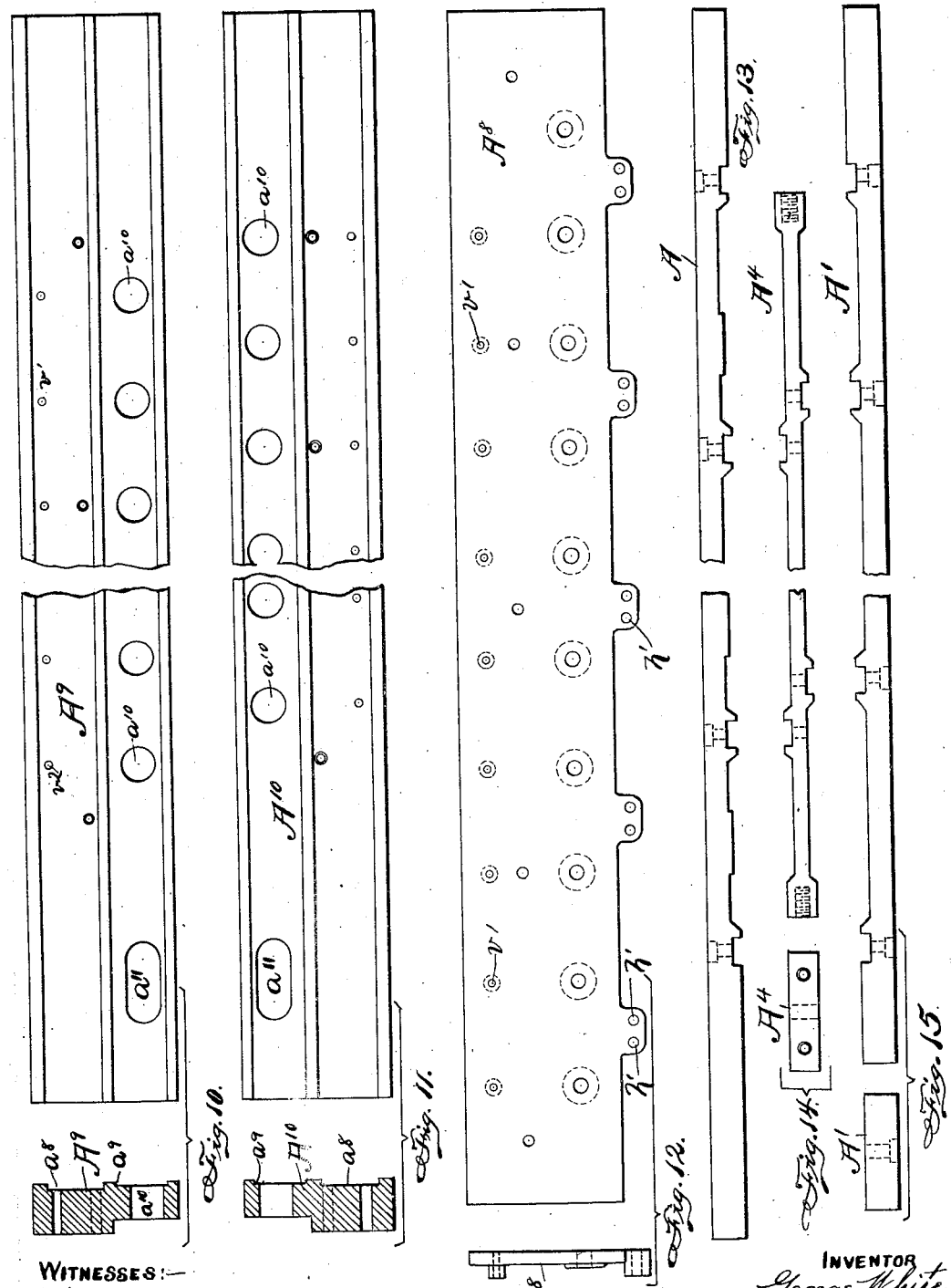

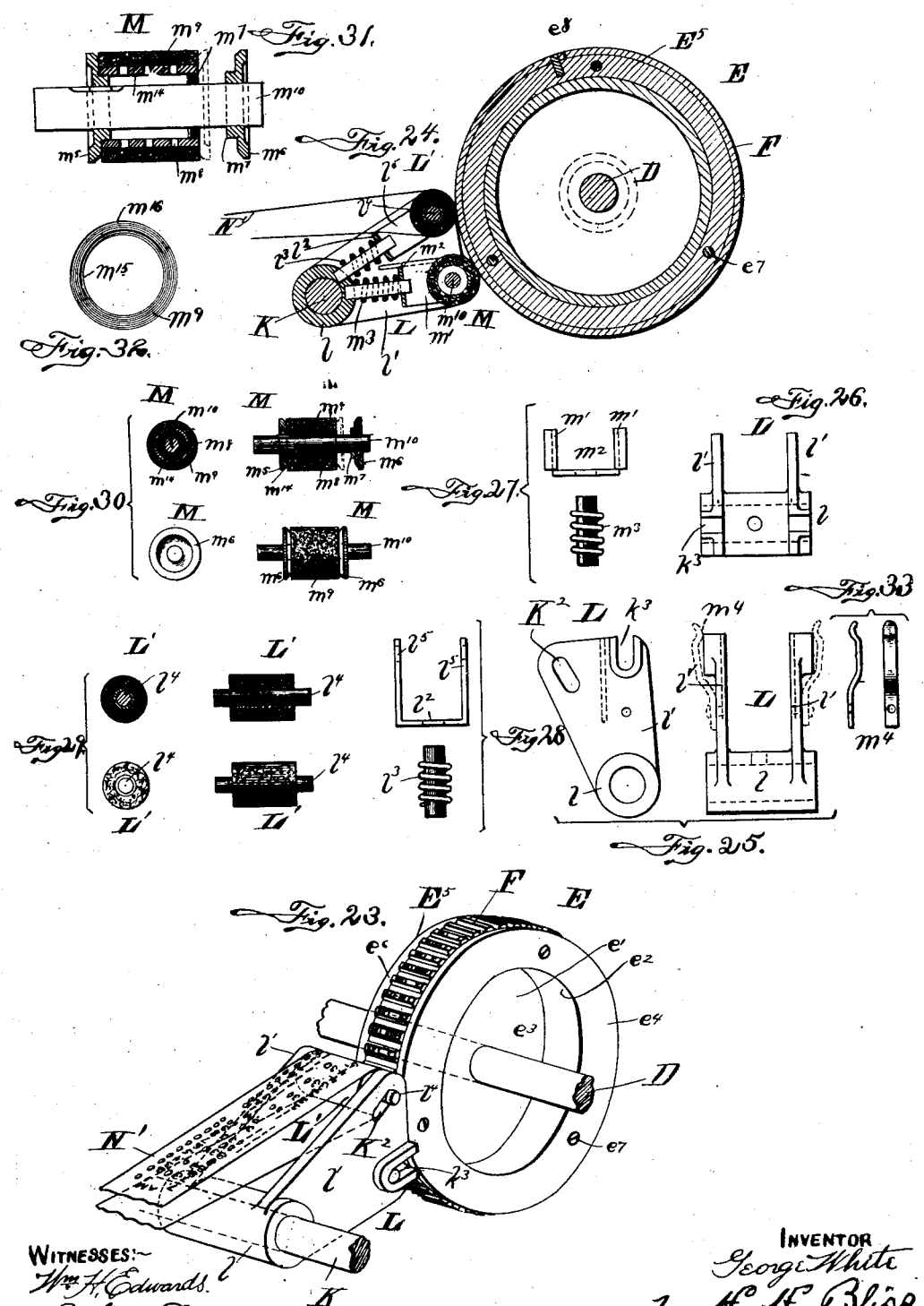

No. 754,401. PATENTED MAR. 8, 1904.
G. WHITE.
TIME RECORDER.
APPLICATION FILED MAY 23, 1895.
NO MODEL. 11 SHEETS—SHEET 9.
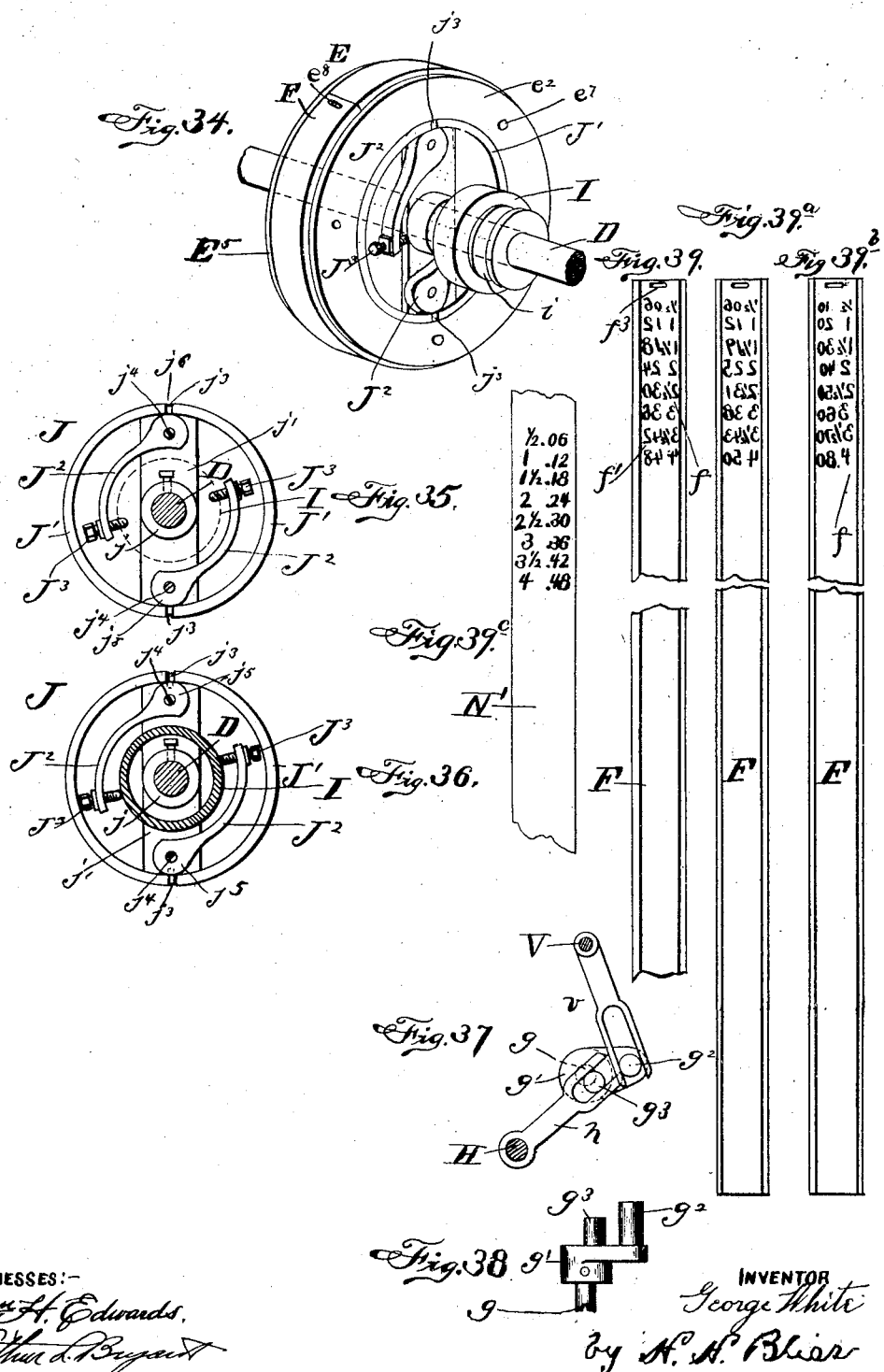
WITNESSES:—
Wm H. Edwards.
Arthur L. Bryant
INVENTOR
George White
by H. H. Bliss
ATTY.

No. 754,401. PATENTED MAR. 8, 1904.
G. WHITE.
TIME RECORDER.
APPLICATION FILED MAY 23, 1895.
NO MODEL. 11 SHEETS—SHEET 10.

WITNESSES
Wm H. Edwards.
Arthur D. Bryant

INVENTOR
George White
by H. H. Bliss
ATTY.

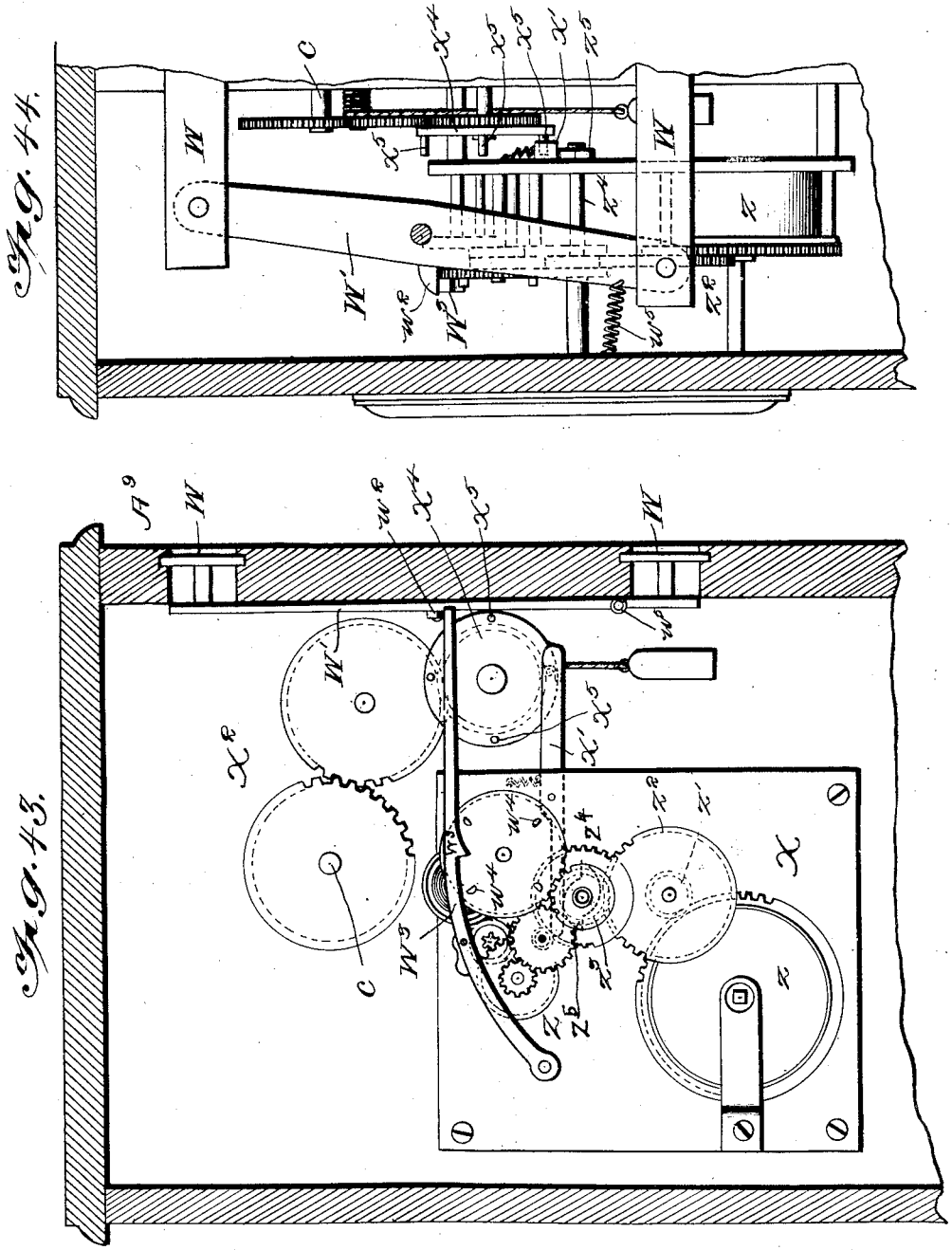

No. 754,401.                                                       Patented March 8, 1904.

UNITED STATES PATENT OFFICE.

GEORGE WHITE, OF JERSEY CITY, NEW JERSEY.

TIME-RECORDER.

SPECIFICATION forming part of Letters Patent No. 754,401, dated March 8, 1904.

Application filed May 23, 1895. Serial No. 550,367. (No model.)

*To all whom it may concern:*

Be it known that I, GEORGE WHITE, a citizen of the United States, residing at Jersey City, in the county of Hudson and State of New Jersey, have invented certain new and useful Improvements in Time-Recorders; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 3:
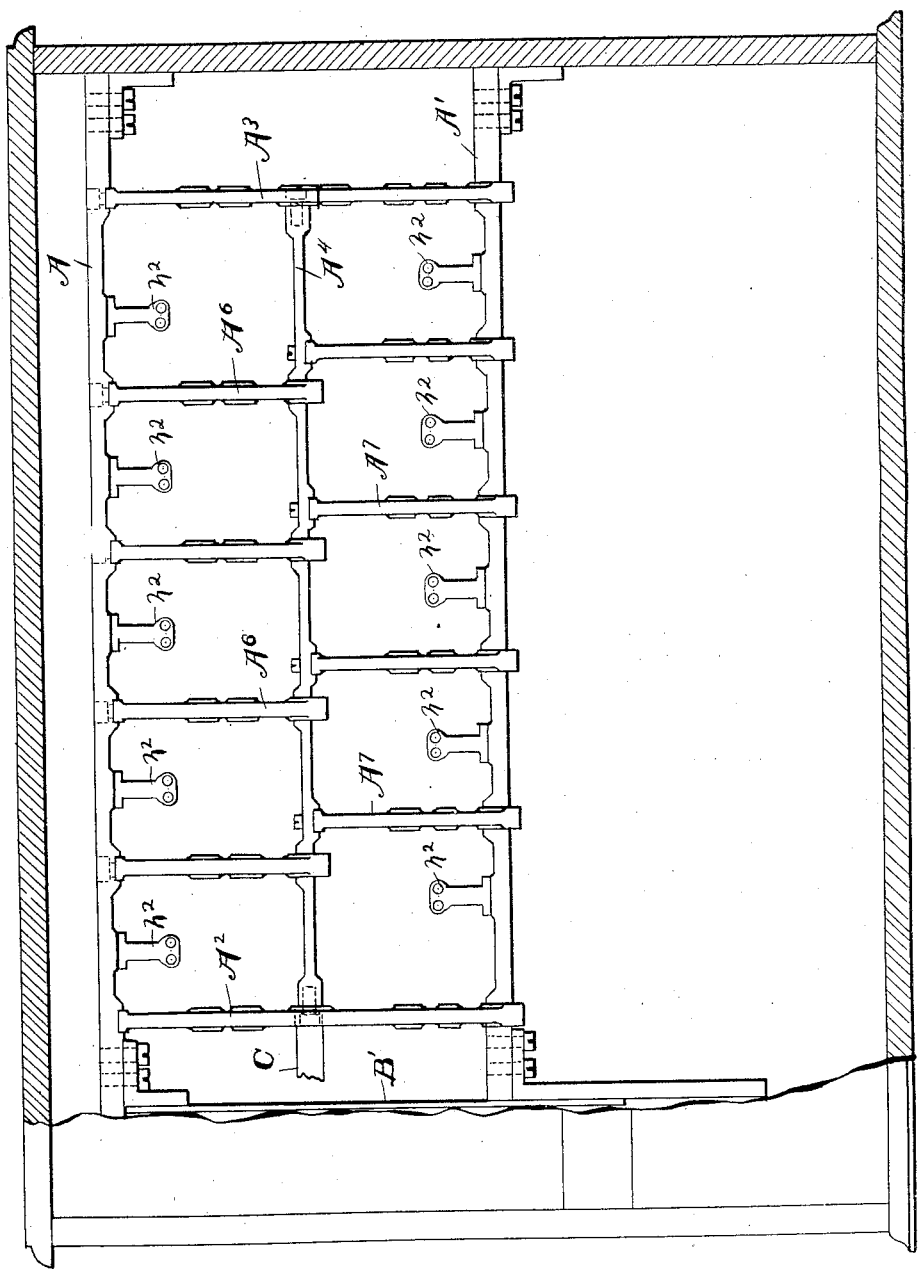
Figure 4:
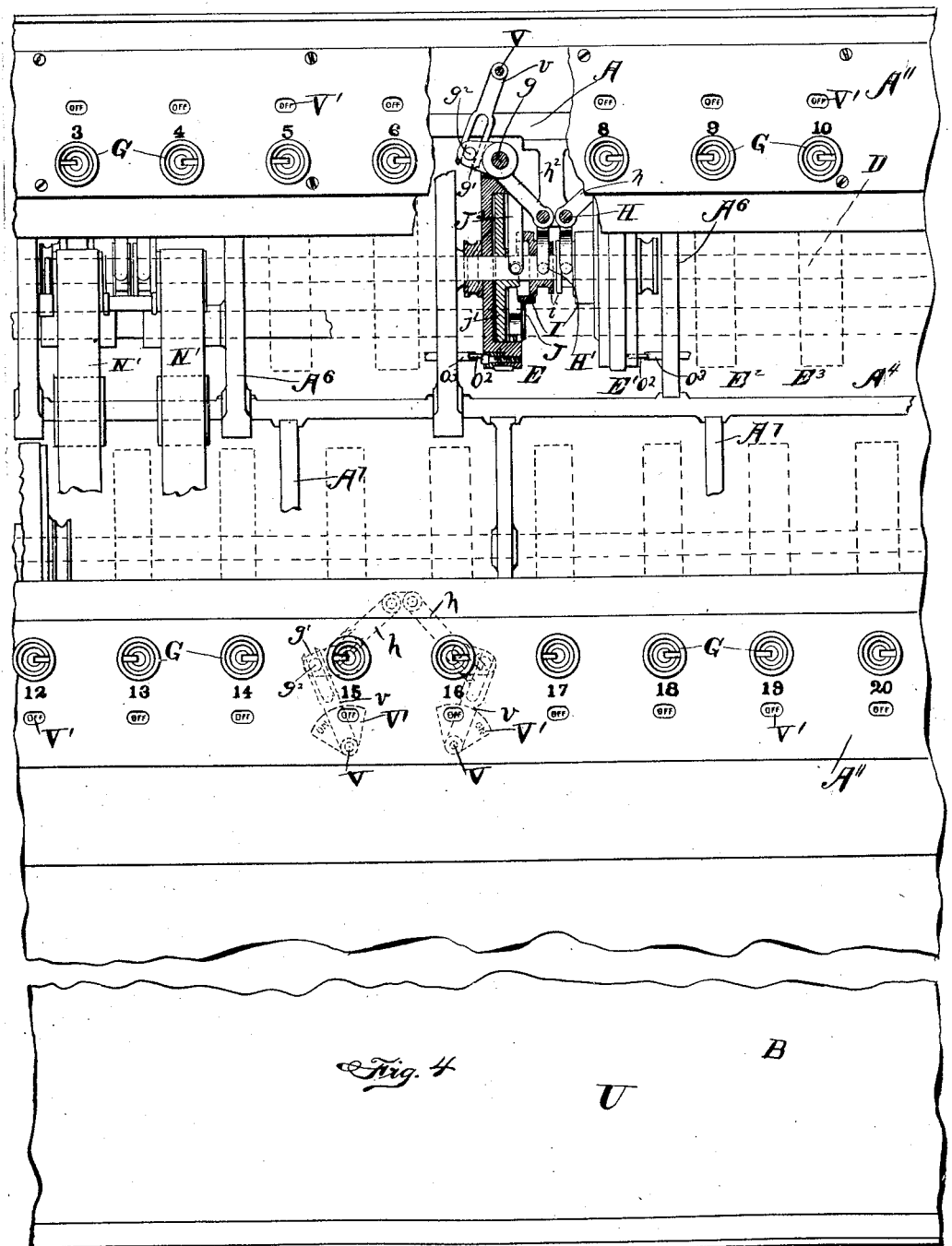
Figure 5:
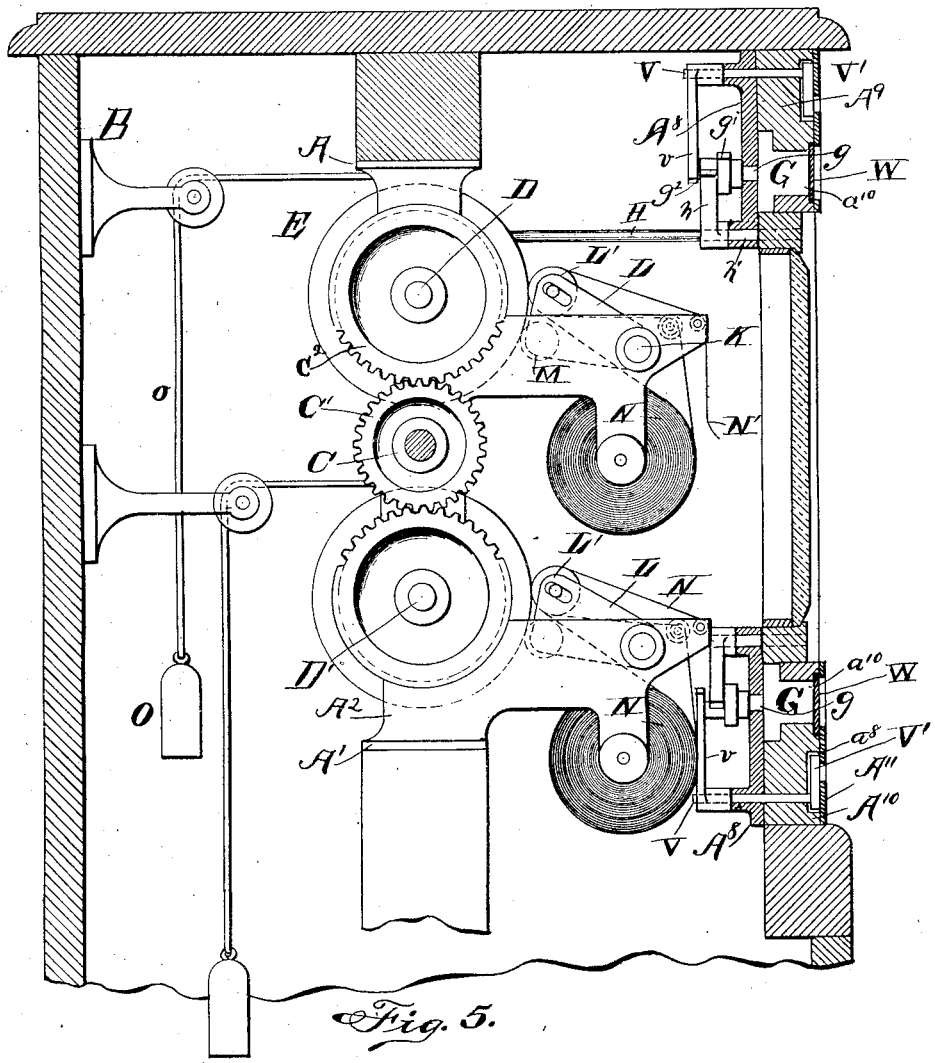
Figure 6:
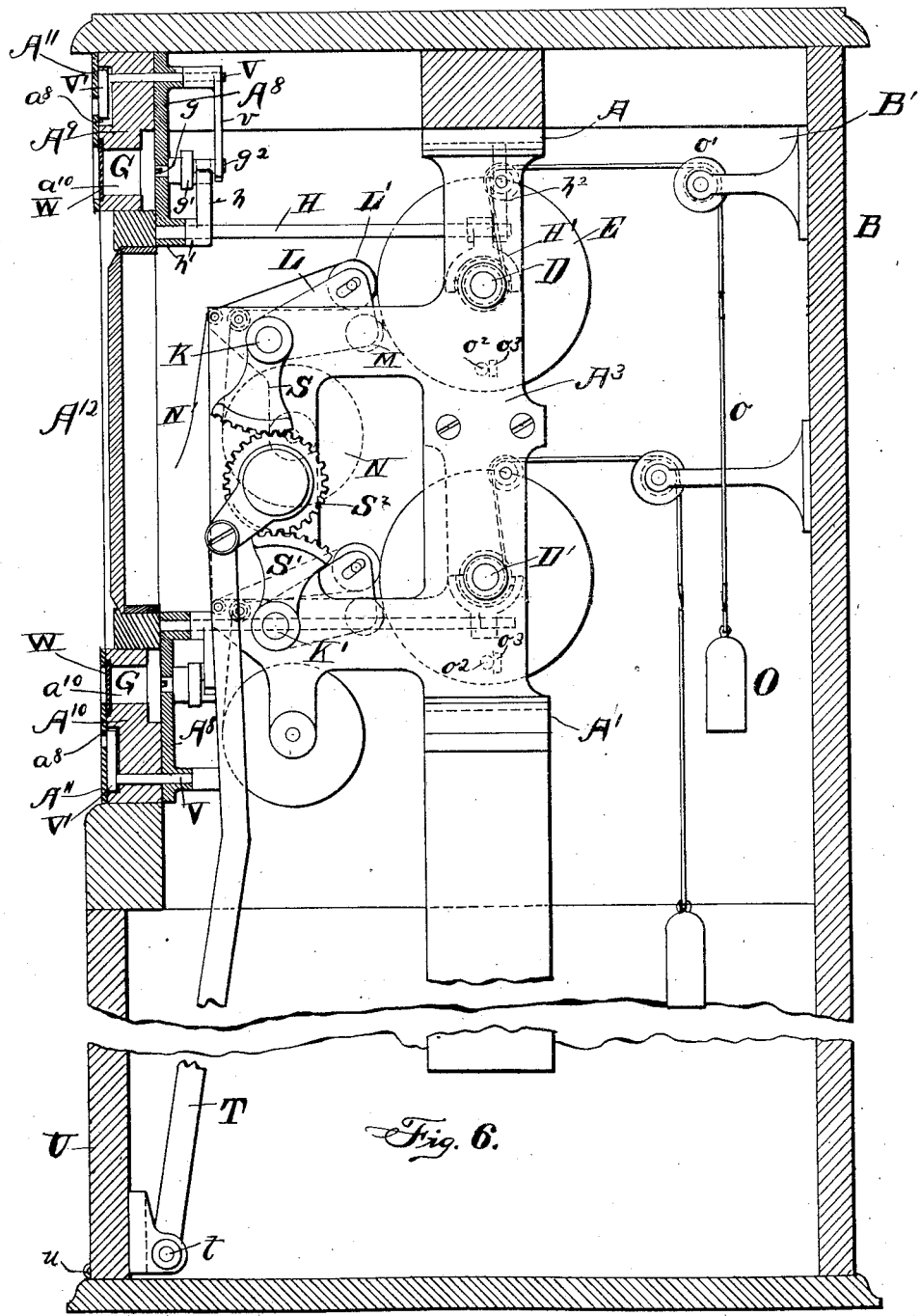
Figure 40:
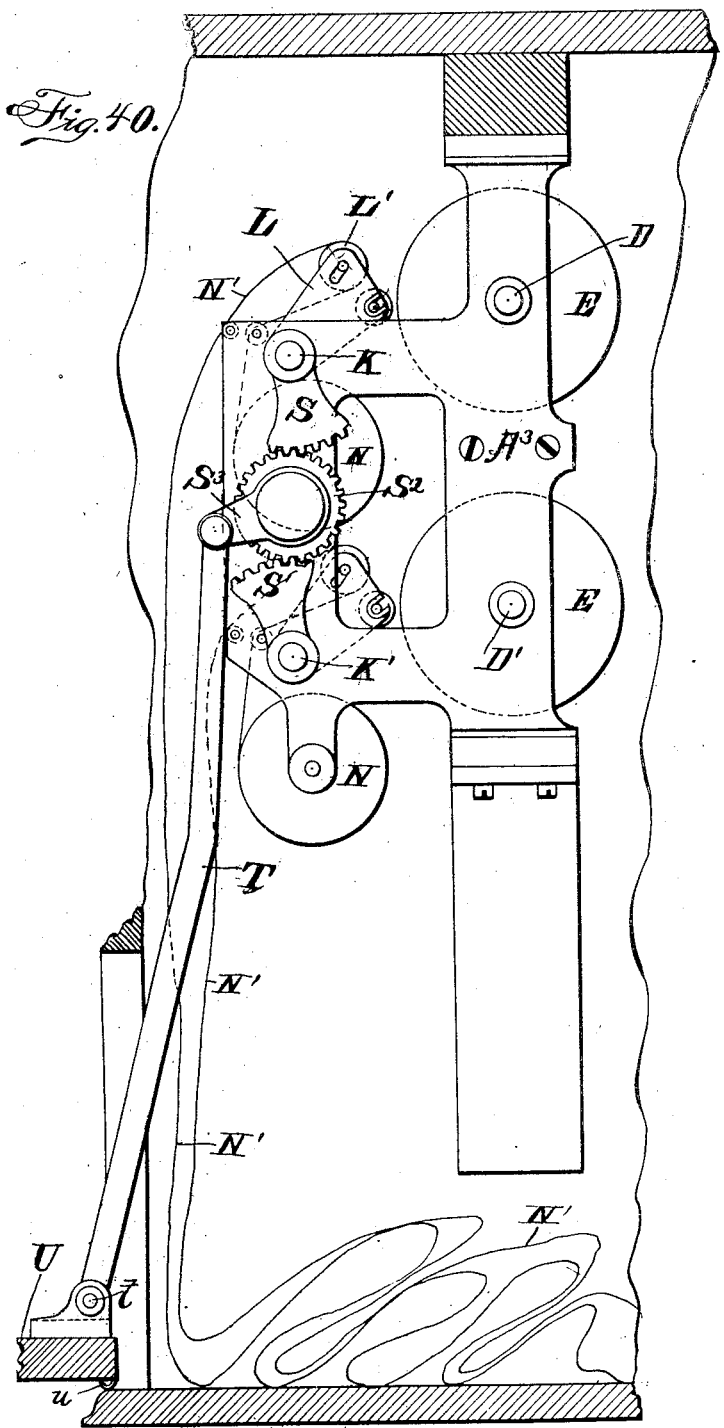

Figure 1 is a side elevation of a time-recording mechanism embodying my improvements. Fig. 2 is an end view of the same. Fig. 3 is a view, partly in section, on the line $x\ x$ of Fig. 2, showing in front elevation the framework which supports the shafting and other parts of the recording mechanism. Fig. 4 is a front view showing a part of the recording mechanism and a part of the casing. Fig. 5 is a partial sectional view on the line $x'\ x'$ of Fig. 1. Fig. 6 is an elevation of the recording mechanism looking from the inner end, the end wall being removed and the casing being in section, the front wall being in section on the line $y\ y$ of Fig. 1. Fig. 7 is a side view and an edge view of the frame-upright at the outer end. Fig. 8 is a side view and an edge view of the frame-upright at the inner end. Fig. 9 is a side view and an edge view of one of the intermediate frame brackets or uprights. Fig. 10 is a face view, partly broken away, and a cross-section of the top lock-plate. Fig. 11 shows similar views of the bottom lock-plate. Fig. 12 is a face view and an end view of one of the plates inside of a series of locks. Fig 13 is an edge view of the top bar of the center frame. Fig. 14 shows the central bar of said frame. Fig. 15 shows the bottom bar. Fig. 16 shows one of the type-wheels in side elevation and in partial section. Fig. 17 shows the friction-clutch ring. Fig. 18 shows one of the clutch-levers. Fig. 19 shows the clutch-operating collar. Fig. 20 shows one of the segment-gears for rocking the printing-frames. Fig. 21 shows the wheel for connecting the two segment-gears. Fig. 22 shows the crank for rocking the gear in Fig. 21. Fig. 23 is a perspective of one of the type-wheels and a printing-frame. Fig. 24 shows the same devices in transverse section. Fig. 25 is a top view and a side view of one of the printing-frames. Fig. 26 is a front end view of the same. Fig. 27 shows in plan view the parts which guide and press outward the inking-roll. Fig. 28 is a similar view of the parts which support and press outward the platen. Fig. 29 shows a cross-section, a longitudinal section, an end view, and a side view of the platen-roller. Fig. 30 shows similar views of the inking-roll. Fig. 31 is a longitudinal section of the inking-roller on a larger scale. Fig. 32 is a cross-section of the porous pad on the inking-roll. Fig. 33 shows detached one of the springs for retaining the inking-roll. Fig. 34 is a perspective of the type-wheel and the friction-clutch assembled. Fig. 35 is a side view of the clutch with the levers in place. Fig. 36 shows the same parts when the hub or collar is in engagement with the levers. Fig. 37 is an inside face view of the parts which operate the clutch and the indicator. Fig. 38 is a top view of the eccentric in Fig. 37. Figs. 39, 39$^a$, 39$^b$, 39$^c$ show type-strips and printed tape. Fig. 40 is an elevation showing the positions to which the inking-frames are thrown when they are moved away from the type-wheels. Fig. 41 shows a key. Fig. 42 shows in front and edge view the plate or bar for closing the keyholes. Fig. 43 is a face view, and Fig. 44 an edge or side view, of one form of motor adapted for use with my improvements.

The interior mechanism is surrounded by a box or casing B, having features of construction and arrangement which will be described below.

B' is a cross plate or frame supported in the main frame and adapted to support upon its front side the motor mechanisms for marking time and for actuating the recording devices, together with the intermediate controlling means or releasing and stopping devices by which the primary motor at predetermined intervals permits the secondary motor to operate; but inasmuch as there are now several well-known forms of clock-movements or equivalent motors and intermediate regulating or controlling devices adapted for this purpose, any one of which can be employed for attaining the purposes more particularly characterizing the present improvement, it will not be necessary to herein illustrate or describe in detail such parts.

It is sufficient to say that the main power-shaft C is actuated at predetermined intervals by the secondary motor (of whatever sort selected) when released by the controlling devices, which are moved by the primary motor. For the purposes of illustrating I have constructed and related the parts of the present mechanism in such way that the recording devices shall be actuated by the primary motor and the controlling means.

Within the casing there is a frame for supporting the various parts of the recording mechanism.

A is a top bar and A' is a bottom bar secured by brackets to the casing or outer frame. At the front end of the recording-chamber there is a vertical bar or plate $A^2$, and at or near the rear end there is another plate, $A^3$. $A^4$ is a central longitudinal bar or plate connecting the parts $A^2$ $A^3$. $A^6$ $A^6$ are an upper series of bars or plates between those at A and $A^4$, and $A^7$ $A^7$ are a lower series of similar bars or plates between those at A' and $A^4$. By examining Figs. 7, 8, and 9 in connection with Fig. 3 the several features of construction and arrangement of these bars or plates will be understood. They are provided with apertures or with bearings for the shafts and rods which support the recording devices, the inking-frames, &c.

The front wall of the casing has a top bar $A^9$, preferably formed of metal and of the shape shown in Fig. 10. It supports a series of locks and mechanisms by which the operatives can start or stop their respective recording devices. It is formed with apertures at $a^{10}$ to serve as keyholes and on the front side has a groove or passage-way $a^9$ to receive the device which intermittingly closes and opens the keyholes, to be below described. It also has a groove or chamber at $a^8$ to hold the series of indicators. At $a^{11}$ it has an elongated aperture through which connection is made between the sliding keyhole-closer and the lever which operates the latter, to be described.

In the mechanism shown there are two series—an upper and a lower—of recording devices and for the lower there is a bar $A^{10}$, which supports a series of locks and other devices and is constructed and arranged substantially as is the bar $A^9$, just described. Upon the front sides of these bars $A^9$ $A^{10}$ there are secured face-plates $A^{11}$, which are provided with keyholes, as shown in Fig. 1. Behind the bars $A^9$ $A^{10}$ there are inside plates $A^8$, (see Figs. 12, 5, and 6,) which are provided with bearings or supporting devices for some of the interior parts.

C is a shaft which receives power from the clock or motor situated in the chamber on the front side of plate B'. Through gears C' and $C^2$ it drives a shaft D, arranged longitudinally in the recording-chamber and mounted in the aforesaid plates $A^2$, $A^3$, and $A^6$. A small fraction of a revolution is imparted to shaft D at every half-hour. It is provided with one or more recording-wheels E E' $E^2$ $E^3$, &c. Any number can be arranged upon the shaft, limited only by the power of the driving-motor. As each of these recording-wheels and its controlling parts and other adjuncts are substantially a duplicate of the others, a description of one, such as that at E, will be sufficient. This wheel E is mounted loosely on the shaft D, it being formed with a hub part $e$, (see Fig. 16,) a web $e'$, and a periphery at $e^2$, it being chambered out, as at $e^3$. The peripheral portion is formed with a flange or lip $e^4$ and with a rabbet at $e^5$.

$E^5$ is a ring which fits in the rabbet $e^5$ and is formed with a flange $e^6$, which is similar in to that at $e^4$.

The ring $E^5$ is secured and adjusted in the rabbet $e^5$ by means of screws at $e^7$.

F, Fig. 39, indicates a type-strip adapted to be placed in the groove or space between the flanges $e^4$ and $e^6$. This type-strip is formed of metal and upon its exterior face has one or more series of type. Preferably there are two series—one indicating periods of time and the other indicating the corresponding amounts of money respectively earned by an operative at the ends of each of such periods of time successively. As aforesaid, the machine illustrated is adapted for making half-hour records. In such case each of the type bands or rings F is formed with a series of numeral-types $f$, commencing with "$\frac{1}{2}$" and continuing with "1," "$1\frac{1}{2}$," "2," "$2\frac{1}{2}$," &c. As different operatives are paid different wages, the type bands or rings vary from each other with respect to the wage-type.

In Fig. 39 a series of type is shown at $f'$ to indicate the amounts earned by an operative who is paid twelve cents per hour, the first characters in the series being ".06," followed by ".12," ".18," ".24," &c.

In Fig. 39ª an arrangement of type is shown such as can be practically used for indicating amounts of wages based on twelve and one-half cents an hour, the series here commencing with ".06," followed by ".12," ".19," ".25," ".31," ".38," &c.

In Fig. 39ᵇ a series is shown in which the basis is twenty cents an hour, in which case it commences with ".10," followed by ".20," ".30," &c.

In all of the figures it will be seen that the characters which indicate the time are the same. In other words, all of the type bands or rings can be alike in length and width and in the type which indicate time, they differing only with respect to the type which indicate the wages due at the corresponding times.

Fig. 39$^c$ shows a piece of the paper tape after it has been printed by a type-band of the character of that in Fig. 39. These type rings or bands are readily detachable from and secured to their respective wheels. To put one in the proper place, the screws $e^7$, Fig. 16, of its wheel E are loosened to permit the ring $E^5$ to be drawn away slightly, and thereafter the type-ring F is laid against the periphery $e^2$ of the wheel and of the ring, and then the screws $e^7$ are again drawn up. The result is to tightly clamp the band in place. To additionally secure it, the inner edges of the flanges $e^4$ and $e^6$ are beveled and the edges of the type-band are correspondingly shaped, as shown in Fig. 16. To insure that the band shall be placed properly with relation to the axis, I provide the periphery $e^2$ with a pin $e^8$, Fig. 24, and form an aperture $f^3$ in the band F. When a band is to be applied, it is so placed that the aperture $f^3$ fits over the pin $e^8$. The perforated end of the band is thus held in proper position, and the other end is carried around the wheel and brought into contact with the end near the perforation to make a perfectly complete circle. The metal of the band may be of any of the sorts used in typographical work, and as these metals are generally more or less flexible the bands can be easily cast in straight forms and can be subsequently bent to a circular curve, so that they can be readily applied to or withdrawn from a wheel without breakage.

As above said, the wheels are each loose on the shaft D; but at any time the operative can clutch or connect the wheel to the shaft as follows, other parts of the mechanism permitting:

At G G there are locks supported, as aforesaid, in the bar $A^9$. Each of these locks may as to its details be of any preferred form, though I at present employ those of the class known as "Yale" locks. When the proper key G', Fig. 41, is inserted, it can after passing the tumblers engage with and rock a shaft $g$, which is mounted in the inside plate $A^8$ and is provided with a crank-head $g'$, having a pin $q^3$, Fig. 37. The latter engages with a lever $h$, carried by a rock-shaft H, Fig. 6. This shaft is mounted in a bearing at $h'$ in the said plate $A^8$ and in a bearing at $h^2$ on the central frame. Its inner end has a shipping-fork H', which engages with the grooved hub $i$, Fig. 34, of a sliding collar I, loose on shaft D. Collar I is adapted to actuate a friction-clutch J, situated in chamber $e^3$ in type-wheel E. The clutch has a hub $j$, secured to shaft D, radial bars $j'$, and split ring J'. The ring is divided at $j^6$ into two parts, each part having an end rigid with the bars $j'$, the other end being free. $J^2 J^2$ are levers pivoted at $j^4 j^4$ to bars $j'$. The short arms $j^5$ have projections $j^3$ arranged to bear against the loose ends of the clutching. The sliding collar I is beveled at $i'$, Fig. 19, and when moved inward by the parts at H and H' through the operative's key the collar engages with the levers $J^2$, separates them, and forces them outward, as will be seen by comparing Figs. 35 and 36, the result being that the levers, through the parts at $j^3$, force the loose ends of the friction-ring outward a short distance and against the inner wall of the periphery $e^2$ of the type-wheel. The minutest fraction of an inch of such outward movement is all that is necessary. In this way a delicately-controllable, but instantly and positive acting, friction engagement can be produced between the ring and the type-wheel.

Preferably the sliding collar I is formed with a hardened surface to engage with the levers, and the levers $J^2$ are provided with hard-steel adjusting-screws $J^3$, adapted to durably resist the wearing action of the clutch-collar I, by means of which a delicate adjustment can be secured and maintained, so that the throw of the levers and of the friction-ring can be regulated with the utmost nicety. By means of these devices it is possible for an operative to at any instant start his type-wheel and to as quickly throw it out of action.

The inking, paper-feeding, and paper-guiding devices are constructed and arranged as follows:

K indicates a rock-shaft mounted in the front part of the frame-plates $A^2$, $A^3$, and $A^6$. To this are secured a series of frames L, each having a hub $l$ and plates $l'$, Figs. 23 and 25.

At $K^2$ there are slots for the platen and at $k^3$ slots for the inking-roll. The platen consists of a roller L' and a shaft $l^4$, whose ends extend through the slots $K^2$. The roller is formed of a tubular core with a flexible jacket, as of rubber, the core or tube fitting loosely but snugly to the shaft $l^4$. This insures that the roll shall have the utmost freedom in rotation and yet be held firmly and uniformly across the type. The shaft $l^4$ is carried by a guide or frame having the side bars $l^5$, Fig. 28, and the cross-plate $l^2$.

$l^3$ is a coiled spring held by a suitable pin and pressing against the platen-frame and normally tending to force the platen-roller toward the type-wheel. This frame also assists in holding the platen uniformly across the entire periphery of the type-wheel.

M indicates the inking-roller. It is carried by a shaft $m^{10}$, whose ends lie in the slots $k^3$. It is pressed outwardly by a frame having the bars $m'$ and the cross-bar $m^2$, against which the spring $m^3$ bears. Springs $m^4$ are placed adjacent to the ends of the shaft $m^{10}$ and are so shaped as to hold the inking-roller in line and prevent its escaping from the slots. This inking-roller is peculiarly constructed. It comprises the said shaft $m^{10}$, a cylinder or drum $m^{14}$, and the heads $m^5$ $m^6$. The head $m^6$ is preferably detachable, being adapted to engage with a thread at $m^7$, by which it can be screwed tightly against the cylinder $m^{14}$.

At $m^8$ there are ink-passages.

$m^9$ is a pad or jacket surrounding and fastened to the cylinder and made of material capable of absorbing, holding, and transmitting the desired amount of ink. The cylinder is charged with ink after removing the head $m^6$. The ink used is preferably one of the sorts employed by printers. After the head is replaced the ink can escape only outwardly through the pad.

I employ a novel form of pad. (Conventionally shown in section in Fig. 32.) It consists of a tape or band of thin linen or suitable woven fabric, which is spirally wound in superposed coils, commencing at $m^{15}$ and terminating at $m^{16}$ on the surface, where by fine threads it is stitched fast. I have found that an inking-roller of this character will carry a sufficient quantity of ink to answer for a long period and will feed and deliver it uniformly in a superior manner. The supply being contained on the inside, there is an effectual overcoming of the difficulty incident to and experienced with those inking-rollers which are supplied from the outside. In the present case there is always an assurance of a fresh supply of moist ink, and there is no trouble experienced from its drying or hardening upon the exterior surface of the pad or roller. By forming the pad in the way described I can vary the feed within close limits to meet any requirements as to proper delivery.

The inking-frames L hold their respective paper tapes against the type-wheels, and when the latter are in motion the tapes are advanced by the pressure of the wheels. When an operative throws out his clutch, its wheel and tape remain stationary under the pressure exerted by the springs $m^3$ and $l^3$. It will be seen that the inking-roller is below the line which joins the axes of shafts D and K and that the platen is above said line and that consequently the type-wheel E is firmly locked from movement in either direction so long as the platen and inking-roller are pressed against it.

The paper is supported on spools N, carried in the hangers at $N^2$ on the frame-pieces $A^2$, $A^3$, and $A^6$. Each tape $N'$ passes upward from the reel or spool over a guide-roller behind the inking-roller and thence between the platen and the type-wheel and thence downward to any desired place. Preferably the loose ends of the tapes are allowed to drop into the chamber in the lower part of the casing, as shown in Fig. 40.

The fact that the type-wheel of any operative is clutched to the shaft or is disengaged therefrom is disclosed by an indicator constructed and operated as follows: The aforesaid crank-head $g'$ immediately behind the lock and rocked by the operative's key has a second crank-pin $g^2$, Fig. 6. This engages with the lever $v$, which is secured to a rockshaft V. The latter is mounted in the apertures $v'$ in the plate $A^8$ and $v^2$ in the bar $A^9$. At its outer end shaft V is connected to an index-plate $V'$, lying in the aforesaid chamber $a^8$ in the bar $A^9$. This index-plate $V'$ is provided with characters, such as the words "on" and "off"—one for showing that the clutch and the type-wheel have been engaged and the other for showing that they have been separated, for it will be understood that when the shaft $g$ turns lever H to move the clutch it simultaneously moves the parts at $v$, V, and $V'$.

W is a sliding bar or plate for closing the keyholes except at predetermined times. It is shown detached in Fig. 42, in dotted lines in Fig. 1, and in vertical section in Fig. 6. It fits in the aforesaid groove or passage at $a^9$ in the bar $A^9$ immediately behind the face-plate $A^{11}$. It is connected with a lever $W'$, Fig. 44, in or near the clock-chamber and adapted to be actuated at proper times by any suitable mechanism controlled by the clock. It is provided with apertures $w$, and when the lever $W'$ moves it these apertures are brought to register with the keyholes of the locks at G. They are held in such registering position for a minute or two at the desired times, and when so held the operatives can have access to their respective locks.

The method of using the mechanism above described will be readily understood by those acquainted with the art to which it appertains. The several operatives have control independently of each other and of other parties of the stopping and the starting of their respective wheels. For instance, if they are paid by the week and it is assumed that the wheels start their actions on Monday morning, that operative or those operatives who have been present from the commencement to the end of each period of working hours will at the end of the week have indicated upon their respective tapes the sum-total of all the half-hours during which they have been engaged and also the sum-total of the wages due for such time. If any operative has fallen short of the full number of working half-hours, it will be indicated by his tape, and a correspondingly-reduced amount of wages will be shown to be due. At the end of the week or other time fixed upon as the pay period the timekeeper opens the door of the casing and throws back all of the inking-frames. He then tears off or examines each of the several tapes and is able to instantly ascertain the time of and the wages due to the operative.

The throwing back of the inking-frames just referred to can be accomplished as follows: The shafts K and $K'$, which support the several series of inking-frames, can be rocked, as shown in Fig. 40, and they then move the said frames upward and carry the platens and inking-rollers away from the type-wheels.

In Figs. 6 and 40, S and S' are gear-segments secured to the rock-shafts K K'. S² is a wheel engaging with these segments and having a crank S³ connected to it. T is a link extending from the crank S³ to a hinge $t$ on the door U, which closes the front side of the bottom part of the chamber. The door is hinged at $u$, and when it is opened it pushes the lever T upward, and the latter rocks wheel S², segments S S', shafts K K', and printing-frames L, and said frames assume the position shown in Fig. 40.

At such time—namely, when the timekeeper opens the door U—the paper tapes are relieved from pressure against the type-wheel, and therefore the timekeeper can tear off, if he desires, the tape at a line back of the last printed character and provide a clean place for the next printing to commence.

Under some circumstances I do not connect the door U to the devices which move the inking-frames. I allow it to be opened independently thereof and provide a lever or equivalent supplemental to the door by which they can be moved at will. This is done when it is desired to have the mechanism so arranged that access can be had to some individual tape without affecting the others. For instance, if during the week it is desired to ascertain how much is due to some employee and to examine his record separately while the others continue in their normal movements it is not desirable to affect the other printing mechanisms in the way described above. In such case the tape of the employee in question is released by drawing the platen-roller back and drawing the paper away from the wheel, the pressure of the ink-roller in the meantime being sufficient to prevent any movement of the type-wheel.

It is necessary at times to return the type-wheels to their zero-points—say, for instance, on or before each Monday morning. Any suitable retracting mechanism can be used. That shown consists of weights O, one for each wheel. The weight is attached to a cord $o$, which extends over one or more sheaves $o'$ and has its end connected to the hub of the type-wheel. As soon as the pressure of the inking-roll and platen is removed from the wheel, as it is when they are in the position shown in Fig. 40, the weight will turn the wheel back to zero-point, assuming that the clutch is disengaged. Hence when the printing-frames are thrown up, whether by movement of the door U or otherwise, the wheels are returned. To stop them accurately at the zero-points, pins $o^2$ are used, which strike the stops $o^3$ on the frame.

As above stated, it is unnecessary to herein describe or illustrate in detail any particular form of clock or motor, either primary or secondary. I prefer to employ motors and controlling devices of the sort used in what is now known as the "Poler" recorder, such as is illustrated and described in Patent No. 547,156, and in Figs. 43 and 44 I have illustrated the general features of such a motor, and in Figs. 43 and 44 I have illustrated more in detail such a motor mechanism as is conventionally illustrated in dotted lines in Fig. 2, as aforesaid. Referring particularly to the last said figures, it will be seen that the prime motor is a simple clock mechanism comprising a spring-barrel $z$ and a train of gears $z'$, $z^2$, and $z^3$ for transmitting motion from said spring-drum to the shaft $z^4$, on which the hands $x$ are mounted, there being the usual regulating-gearing at Z. On the said shaft $z^4$ there is secured a cam $z^5$, adapted to contact with one end of the lever $x'$, and the other end of said lever is adapted to engage with laterally-projecting pins $x^5$ on a disk $x^4$, forming part of the secondary motor, (indicated as a whole by $X^2$.) When the cam $z^5$ releases the lever $x'$ from the secondary motor, the latter is allowed to move and impart movement to the shaft C, which drives the recording devices until the next succeeding pin or stud $x^5$ comes into contact with the lever $x'$ and again holds the secondary motor stationary.

$W^4$ indicates a gear-wheel or disk which is geared to the prime motor and adapted to revolve once in twenty-four hours. On one face this disk is provided with a series of projecting cam-studs $w^4$, corresponding in number to the times which it is desired to move the slides W to uncover the locks G, and said cam-studs are adapted to contact with a cam $w^3$, carried by a lever $W^3$, the free end of which projects under a finger $w^2$, projecting from the lever W' at its fulcrum. By this arrangement of parts it will be seen that the lever W' will be rocked and the slides W moved whenever one of the cams $w^4$ causes the lever $W^3$ to rock upward at its free end. The slides W and lever W' are normally maintained in the positions indicated in Figs. 1 and 44 by a spring $w^5$. However, as stated above, any suitable mechanism by which the driving-shaft will be intermittingly actuated and the slide W will be moved to uncover the locks G at predetermined intervals of time while the power-shaft and recording devices are held against movement may be substituted for the form of motor illustrated and described herein.

I am aware of the fact that friction-clutches of numerous sorts have been heretofore used for various purposes, and therefore do not, of course, claim a friction-clutch broadly as of my invention; but I believe myself to be the first to have overcome the difficulties that have been met with in using time-recording wheels having clutches combined with them. When positive or toothed clutches are used in these recording devices, there must be a very large number of teeth provided on the mutuallyengaging parts, or where a pin is used on one clutch member and a series of pin-holes on the other these holes must be very numerous and very accurately disposed. Unless there are such numerous teeth or numerous holes there is no assurance that the two clutch members will come together on lines of engagement. For instance, where a pin and a series of holes are used there is no assurance that the pin will move exactly on the line of either of the holes. If it strikes the opposing clutch member on a line at either side of one of the holes, it will fail to engage. If it should partially enter one of the holes, but be out of proper alinement therewith, it will move the type-wheel in one direction or the other undesirably. One peculiar difference incident to this mechanism in contrast with the numerous others which contain friction-clutches is that at the time the clutch is being engaged both the driving member and the driven one are standing still, whereas in ordinary clutch mechanism one of the clutch members is constantly rotating. In other words, in time-recording mechanisms of the class including that herein a friction-clutch has novel and peculiar features incident to it, this being the only place to my knowledge where it is absolutely essential to effect an engagement between the two members while they are both stationary and have such engagement assured before either commences to move, so that it will be absolutely necessary for both to move at the instant when either starts.

The type-bars F are made cheaply and rapidly by setting in a narrow "form" ordinary type presenting the desired characters. A matrix is then obtained therefrom in any of the now well-known ways. Upon such matrix the metal for the band F is placed when in proper condition. After hardening it is withdrawn and its edges are trimmed and shaped. It is then bent into the circular form and is ready to be applied to the wheel.

I do not claim the combination, with a recording mechanism adapted to be controlled through a lock and a motor adapted to intermittingly actuate said recording mechanism, of a slide-bar adapted to prevent access to the lock controlling the recording mechanism and means controlled by the motor for withdrawing said slide at predetermined intervals of time and while the recording devices are stationary, as I believe that to be the invention of Charles Korfhage; but there are certain advantages incident to the particular construction and arrangement of parts herein illustrated and described by which the above-described operations are carried on.

What I claim is—

1. In a time-recording mechanism, the combination of a power-shaft, a motor adapted to intermittingly rotate said shaft, a recording-wheel loosely mounted on the shaft, a casing surrounding said shaft and wheel, a friction-clutch interposed between said wheel and shaft, a lock G supported by the inclosing casing, operating devices controlled by said lock, a stop for preventing access to the lock, and connections between said stop and the motor whereby the stop will be automatically withdrawn at predetermined intervals of time while the power-shaft and recording-wheel are stationary, substantially as set forth.

2. In a time-recording mechanism, the combination of an inking mechanism, a platen, a rotary wheel, a band of type-metal of a length equal to the periphery of the wheel and bent to encircle it, the ends of said band being separable whereby it is detachable, and the face being provided with raised type-indicating arithmetically-progressing characters, means for holding said band against peripheral motion on the wheel, and means for clamping said band laterally whereby bands with differing characters can be interchangeably substituted, substantially as set forth.

3. In a time-recording mechanism, the herein-described platen-presser, it having a yielding jacket, a shaft or central carrier, the tube fitted tightly to the jacket and fitted loosely to and rotating on the central shaft, the yoke-frame $l^2$, $l^5$, and the spring for moving the frame and platen, in combination with the printing-wheel in front of the platen, substantially as set forth.

4. In a time-recording mechanism, the combination with the recording-wheel, of the printing-frame L, the frame $l^2$, $l^5$ arranged within the frame L, the platen supported in said frame, and the coiled spring arranged between the platen and the frame $l^2$, substantially as set forth.

5. In a time-recording mechanism, the combination with the recording-wheel, of the printing-frame L, having slots $k^3$, formed therein, an inking-roller journaled in said slots, and spring-arms $m^4$ attached to the frame L and bearing against the ends of the inking-roller, substantially as set forth.

6. In a time-recording mechanism, the combination with the recording-wheels, and the printing-frames L, of the rotary gearing for removing the printing-frames from the recording-wheels, and the door or equivalent lever connected to the gearing for actuating it, substantially as set forth.

7. In a time-recording mechanism, the combination of the recording-wheel, devices for moving the wheel in one direction, the rock-shaft K, the printing-frame L mounted on said rock-shaft and carrying the inking-roller which contacts with and prevents retrograde movement of the recording-wheel, a door or equivalent lever geared to the rock-shaft to move the printing-frame from the recording-wheel, and a weight or equivalent device connected with the recording-wheel for moving the same when the inking-roller is out of contact therewith, substantially as set forth.

8. In a time-recording mechanism, the combination of a recording-wheel, devices for moving said wheel in one direction, the rock-shaft K, the printing-frame mounted on said shaft and carrying the inking-roller adapted to contact with and normally hold the recording-wheel stationary when disconnected from its power or driving devices, the gear $S^2$ mounted on a shaft and meshing with a segment S on the rock-shaft, a lever connected to said gear and to a door, and a weight connected to the recording-wheel and adapted to rotate the same when the inking-roller is out of contact therewith and the power devices are disconnected therefrom, substantially as set forth.

9. In a time-recording mechanism, the combination of a power-shaft, a recording-wheel loosely mounted on said shaft, means for connecting the recording-wheel to the shaft to cause the same to move therewith, and a visual indicator connected with the said connecting means and adapted to indicate whether the wheel is fast to or detached from the power-shaft, substantially as set forth.

10. In a time-recording mechanism, the combination with suitable driving devices, and a recording-wheel, of a clutch adapted to connect the recording-wheel to the driving mechanism, a shaft $g$ for actuating the clutch, a lever $v$, adapted to be actuated by the shaft $g$, and a visual indicator connected with the lever $v$, whereby the relative position of the clutch and recording-wheel will be indicated simultaneously with the movement of the clutch in either direction, substantially as set forth.

11. In a time-recording mechanism, the combination with the recording devices, the driving devices, the means for connecting and disconnecting the driving devices, the shaft $g$, and the lock G, of the bar $A^9$ adapted to support a series of said locks and the shafts $g$, substantially as set forth.

12. In a time-recording mechanism, the combination with power devices, a recording-wheel, and devices for connecting the power devices and recording-wheel, of a visual indicator, a lock, and means controlled by the lock for actuating the devices for connecting the recording-wheel and power devices and simultaneously actuating the visual indicator to indicate the relative positions of the recording-wheel and power devices, substantially as set forth.

13. In a time-recording mechanism, the combination of a motor, a recording-wheel, means for connecting the recording-wheel to the motor, a lock, a rock-shaft $g$ adapted to be actuated by a key in the lock, a rock-shaft H connected with the means for connecting the motor and recording-wheel and adapted to be actuated from the shaft $g$, a visual indicator, and a lever connected with said indicator and adapted to be operated by the shaft $g$, simultaneously with the shaft H, to indicate the relative positions of the motor and recording-wheel, substantially as set forth.

14. In a time-recording mechanism, the combination with a motor, a recording device, and means for connecting the recording device to the motor, of a lock, a rock-shaft $g$ adapted to be actuated from the lock, a rock-shaft H connected with the means for connecting the motor and recording devices and having arm $h$ connected with the rock-shaft $g$, a visual indicator, and a lever connected with said indicator and having one end bifurcated to receive a pin or lug on the shaft $g$, whereby both the indicator and means for connecting the motor and recording device will be simultaneously actuated, substantially as set forth.

15. In a time-recording mechanism, the combination of a type or printing wheel, an intermittingly-acting motor, means for connecting said wheel to the motor, a platen contacting with the printing-wheel in one direction approximately tangential to the periphery of said wheel, and an inking-roller contacting with said wheel in a direction tangentially opposite to the direction of contact of the platen, whereby said wheel will be held from movement in either direction when disengaged from the motor, substantially as set forth.

16. In a time-recording mechanism, the combination of a wheel having a series of printing characters on its periphery, an intermittingly-acting motor, devices for connecting the said wheel with the motor and a pivotally-supported printing-frame contacting with said wheel at points on opposite sides of a straight line joining the axis of said wheel and the axis of the fulcrum of said frame, whereby the said wheel will be held against movement in either direction when not being actuated by the motor, substantially as set forth.

17. In a time-recording mechanism, the combination of a power-shaft, a motor connected with and intermittingly actuating said shaft, a series of type-wheels loosely mounted on the power-shaft, an independent clutch mechanism for connecting each wheel to said shaft, a series of printing-frames all mounted to rock about a common axis and each contacting with one of the type-wheels at points on opposite sides of a straight line joining the said axis with the axis of the power-shaft, whereby each type-wheel will be held stationary when the motor is still or said wheel is disconnected therefrom, means for simultaneously rocking all of said printing-frames out of contact with the type-wheels, and means for maintaining each wheel in a predetermined position when disconnected from the power-shaft and its printing-frame, substantially as set forth.

18. In a time-recording mechanism, the combination of an intermittingly-rotating shaft, a wheel loosely mounted on said shaft and provided with a series of peripheral printing characters, a friction-clutch adapted to connect the said wheel to the shaft at any point of the circle surrounding the shaft, and means for preventing movement of said clutch when the shaft is in motion, substantially as set forth.

19. In a time-recording mechanism, the combination of an inclosing casing, parallel vertically-arranged uprights, $A^2$, $A^3$ supported within said casing, a motor arranged within said casing between an end wall thereof and one of said uprights, a shaft D journaled in bearings in said uprights, a power-shaft extending from the motor to the upright $A^2$, gearing connecting said shafts together, a series of recording-wheels loosely supported on said shaft D, a clutch for connecting each of said wheels to said shaft, a rock-shaft journaled in bearings in said uprights and extending across the peripheries of all the recording-wheels, printing-frames carried by said shaft and adapted to normally contact with the recording-wheels, and a lever connected with said rock-shaft for simultaneously moving all of said printing-frames out of contact with the recording-wheels, substantially as set forth.

20. In a time-recording mechanism, the combination of an inclosing casing, parallel vertically-arranged uprights, $A^2$, $A^3$, supported within said casing, a motor arranged within said casing, two shafts, D, D′, journaled in bearings in said uprights, a power-shaft geared to the motor and to both shafts D, D′, a series of recording-wheels mounted on said shafts D, D′, two rock-shafts extending parallel to said shaft D, D′, printing-frames carried by said shafts and adapted to contact with the recording-wheels, a gear mounted on each rock-shaft, a pinion mounted on the upright, $A^3$, and meshing with both said gears on the rock-shaft, and an operating-lever connected with and adapted to actuate said pinion, substantially as set forth.

In testimony whereof I affix my signature in presence of two witnesses.

GEORGE WHITE.

Witnesses:
 SAMUEL D. HAINES,
 H. H. BLISS.